(12) United States Patent
Purcarea et al.

(10) Patent No.: US 10,020,658 B2
(45) Date of Patent: Jul. 10, 2018

(54) POWER TRANSMISSION ARRANGEMENT

(71) Applicant: Robert Bosch GmbH, Stuttgart (DE)

(72) Inventors: Calin Purcarea, Stuttgart (DE); Erik Weissenborn, Stuttgart (DE); Martin Kessler, Schwaebisch Gmuend (DE); Wolfgang Haas, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 287 days.

(21) Appl. No.: 14/764,285

(22) PCT Filed: Jan. 15, 2014

(86) PCT No.: PCT/EP2014/050666
§ 371 (c)(1),
(2) Date: Jul. 29, 2015

(87) PCT Pub. No.: WO2014/118000
PCT Pub. Date: Aug. 7, 2014

(65) Prior Publication Data
US 2015/0372499 A1 Dec. 24, 2015

(30) Foreign Application Priority Data
Jan. 31, 2013 (DE) .......... 10 2013 201 637

(51) Int. Cl.
*B60L 11/18* (2006.01)
*H02J 5/00* (2016.01)
(Continued)

(52) U.S. Cl.
CPC .............. *H02J 5/005* (2013.01); *B60L 1/003* (2013.01); *B60L 11/182* (2013.01);
(Continued)

(58) Field of Classification Search
CPC ........ B60L 1/003; B60L 5/005; B60L 11/182; B60L 11/1868; H01F 38/14; H02J 5/005;
(Continued)

(56) References Cited

U.S. PATENT DOCUMENTS 5,322,577 A 6/1994 Greten et al.
5,633,577 A 5/1997 Matsumae et al.
(Continued)

FOREIGN PATENT DOCUMENTS

CN 102412604 A 4/2012
CN 102458912 A 5/2012
(Continued)

OTHER PUBLICATIONS

International Search Report corresponding to PCT Application No. PCT/EP2014/050666, dated Oct. 22, 2014 (German and English language document) (7 pages).

*Primary Examiner* — Levi Gannon
(74) *Attorney, Agent, or Firm* — Maginot, Moore & Beck LLP

(57) ABSTRACT

The disclosure relates to a power transmission arrangement having an electromagnetic convertor unit, the input side of which can be coupled to an AC voltage source, a first DC voltage circuit, the input side of which is coupled to the electromagnetic converter unit and the output side of which can be coupled to a first electrical DC voltage sink, and which is designed to provide a first DC voltage on the output side, and a second DC voltage circuit, the input side of which is coupled to the electromagnetic converter unit and the output side of which can be coupled to a second electrical DC voltage sink, and which is designed to provide a second DC voltage on the output side, wherein one of the DC voltage circuits has a DC voltage converter for the purpose of adjusting its output-side DC voltage.

14 Claims, 7 Drawing Sheets

(51) Int. Cl.
*H02J 7/02* (2016.01)
*H02J 50/40* (2016.01)
*B60L 1/00* (2006.01)
*H02M 7/217* (2006.01)
*H02J 7/00* (2006.01)
*H02M 3/335* (2006.01)
*H02J 17/00* (2006.01)

(52) U.S. Cl.
CPC ....... *B60L 11/1816* (2013.01); *B60L 11/1868* (2013.01); *H02J 5/00* (2013.01); *H02J 7/0013* (2013.01); *H02J 7/0054* (2013.01); *H02J 7/02* (2013.01); *H02J 17/00* (2013.01); *H02J 50/40* (2016.02); *H02M 3/33561* (2013.01); *H02M 7/217* (2013.01); *B60L 2210/12* (2013.01); *B60L 2210/14* (2013.01); *B60L 2210/30* (2013.01); *B60L 2210/40* (2013.01); *H02J 7/0018* (2013.01); *Y02T 10/7005* (2013.01); *Y02T 10/7066* (2013.01); *Y02T 10/7072* (2013.01); *Y02T 10/7225* (2013.01); *Y02T 10/7233* (2013.01); *Y02T 10/7241* (2013.01); *Y02T 90/122* (2013.01); *Y02T 90/127* (2013.01); *Y02T 90/14* (2013.01)

(58) Field of Classification Search
CPC ...... H02J 7/0013; H02J 7/0018; H02J 7/0054; H02J 7/025; H02J 17/00; H02J 50/10; H02J 50/12; H02J 50/40; H02M 3/33561; H02M 7/217; H04B 5/0037; H04B 5/0075; H04B 5/0087; H04B 5/0093; Y02T 10/7005; Y02T 10/7066; Y02T 10/7072; Y02T 10/7225; Y02T 10/7233; Y02T 10/7241; Y02T 90/122; Y02T 90/127
USPC ....................................................... 307/104
See application file for complete search history.

(56) References Cited

U.S. PATENT DOCUMENTS

| | | | |
|---|---|---|---|
| 2012/0068663 A1* | 3/2012 | Tanikawa | B60L 11/1816 320/109 |
| 2014/0097697 A1* | 4/2014 | Cho | G06F 1/26 307/104 |
| 2015/0194814 A1* | 7/2015 | Taylor | H02J 5/005 307/31 |
| 2016/0016479 A1* | 1/2016 | Khaligh | B60L 11/1812 363/17 |

FOREIGN PATENT DOCUMENTS

| | | |
|---|---|---|
| DE | 196 46 666 A1 | 6/1997 |
| EP | 1 020 973 A2 | 7/2000 |
| EP | 2 434 604 A1 | 3/2012 |
| WO | 2010/150139 A1 | 12/2010 |
| WO | 2011/141785 A1 | 11/2011 |

* cited by examiner

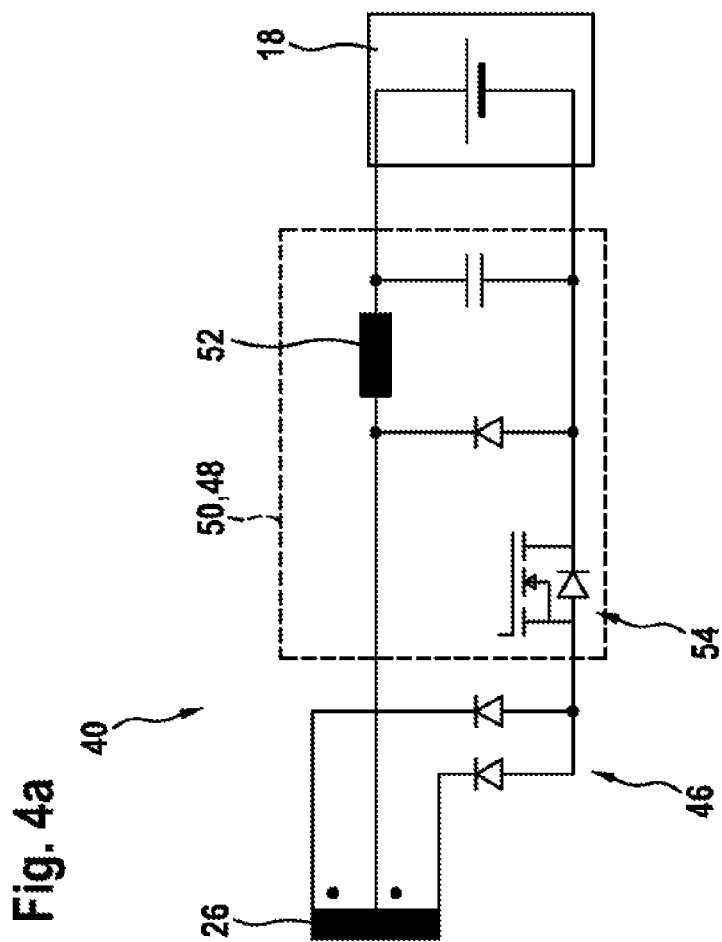

POWER TRANSMISSION ARRANGEMENT

This application is a 35 U.S.C. § 371 National Stage Application of PCT/EP2014/050666, filed on Jan. 15, 2014, which claims the benefit of priority to Serial No. DE 10 2013 201 637.9, filed on Jan. 31, 2013 in Germany, the disclosures of which are incorporated herein by reference in their entirety.

The present disclosure relates to a power transmission arrangement having an electromagnetic converter unit which is couplable on the input side to an AC voltage source.

BACKGROUND

It is generally known in the field of motor vehicle drive technology to use an electric machine as single drive or together with a drive motor of another type (hybrid drive). Polyphase electric machines are typically used as drive motor in such electric or hybrid vehicles. Power electronics which contain an inverter which converts the DC voltage or the direct current from a high-voltage battery on-board the motor vehicle into an alternating current are used in order to actuate such polyphase machines in a motor vehicle. In this case, the inverter is actuated by a control device such that the electric machine, in the motor operating mode, generates a particular torque at a particular rotational speed at an output shaft of the electric machine. Thus, the high-voltage battery of the motor vehicle provides the energy necessary for driving the motor vehicle. For this reason, the high-voltage battery in electric vehicles or plug-in hybrid vehicles must generally be connected via an appropriate battery charging device to an electrical energy supply system, depending on the state of charge, in order to charge the high-voltage battery with electrical energy.

In addition to the battery charging device for charging the high-voltage battery, electric and plug-in hybrid vehicles usually have an on-board power supply system DC-to-DC voltage converter which is designed to feed electrical energy from the high-voltage battery into a low-voltage on-board power supply system (typically with a DC voltage of 12 V). The low-voltage on-board power supply system is used here to supply the consumers found in the motor vehicle and usually has a low-voltage battery which supplies electrical energy to the low-voltage on-board power supply system.

The DC-to-DC voltage converter is operated in a power range of from 1.5 to 2.5 kW, for example. In this case, the maximum current is generally limited on the secondary side (for example to 120 A). The battery charging device for charging the high-voltage battery has a single-phase embodiment as standard and has a typical charging power of approximately 3.5 kW.

A known on-board power supply system topology of vehicle power electronics is designed, for example, such that the charging device and the DC-to-DC voltage converter form independent devices which are connected via the high-voltage battery or an intermediate circuit capacitor. For reasons of safety, both the charging device and the DC-to-DC voltage converter must be designed to be electrically isolated. The electrical isolation is usually realized by means of a transformer. Thus, the charging device can also be implemented in the form of an electrically isolated DC-to-DC voltage converter. In addition to the two DC-to-DC voltage converters, known on-board power supply system topologies have additional voltage adjustment stages (for example boost converters, buck converters) and further electric circuits which are used, for example, to increase the so-called power factor.

If the electric or plug-in hybrid vehicle is connected to the power supply system in order to charge the high-voltage battery, then the low-voltage on-board power supply system must be supported during said charging process since particular consumers (for example pumps, fans, control electronics) are still active. However, the power requirement for supporting the low-voltage on-board power supply system is relatively low and ranges, for example, in a range of from 200 to 400 W. In this case, the efficiency of the energy transfer from the power supply system to the low-voltage on-board power supply system of the motor vehicle is very low since the charging device and the on-board power supply system DC-to-DC voltage converter are connected in series in the on-board power supply system topology described above.

A charging device for a battery-operated vehicle with at least one traction battery for operating an electric motor and at least one on-board battery for supplying an on-board power supply system is known from DE 196 46 666. The described charging device enables integration in terms of circuitry of the charging device and the DC-to-DC voltage converter. A transformer, which has a primary winding and two secondary windings, is used for this purpose. The primary winding of the transformer can optionally be electrically coupled to a supply system or to the traction battery using a changeover device. In a charging operating mode of the charging device, the changeover device is switched such that the traction battery is coupled to the first secondary winding of the transformer and the on-board battery is coupled to the second secondary winding of the transformer.

The translation ratios of the charging device are predefined by the number of turns of the transformer. The primary side of the transformer can be actuated for simultaneous or parallel charging of the traction battery and the on-board battery such that a voltage adjustment takes place for the traction battery. The voltage across the on-board battery then results automatically according to the translation ratio of the transformer. Crucial aspects for the power distribution to the traction battery and the on-board battery are the translation ratios of the transformer, the voltage level of the traction battery and of the on-board battery and the output impedance of the two secondary sides of the transformer. Active control of the power flows from the power supply system to the traction battery or from the power supply system to the on-board battery during parallel charging of the traction battery and the on-board battery is not possible with the known on-board power supply system topologies.

As an alternative to the parallel charging, there exists the possibility of charging the traction battery and the on-board battery sequentially. By way of example, the traction battery can be charged in a first time interval, for example, with a power of 3.5 kW. Then, in a second time interval, the on-board battery can be charged with maximum power (for example with 1.8 kW). However, this leads to heavy cycling of the on-board battery. The discharge-charge cycles taking place shortly one after another cause a reduced service life of the on-board battery. In addition, the sequential charging increases the charging time of the traction battery since the traction battery charging process is repeatedly interrupted for an on-board battery charging process.

SUMMARY

The present disclosure therefore provides a power transmission arrangement having an electromagnetic converter unit which is couplable on the input side to an AC voltage source, a first DC voltage circuit which is coupled on the input side to the electromagnetic converter unit and couplable on the output side to a first electrical DC voltage sink and is designed to provide a first DC voltage on the output side, and a second DC voltage circuit which is coupled on the input side to the electromagnetic converter unit and couplable on the output side to a second electrical DC voltage sink and is designed to provide a second DC voltage on the output side, wherein one of the DC voltage circuits has a DC-to-DC voltage converter for adjusting the output-side DC voltage of said DC voltage circuit.

In this embodiment, the first and second electrical DC voltage sinks are designed, by way of example, as first and second electrical energy stores. Advantageously, output-side voltages can be adjusted using the electromagnetic converter unit and the DC-to-DC voltage converter, which output-side voltages can be controlled independently of one another. Hence, power flows from the AC voltage source (for example a power supply system) to the respective DC voltage sinks or electrical energy stores can also be actively controlled. The parallel charging of the first and second electrical energy stores which is now possible leads to a reduced charging time in comparison with sequential charging of the two energy stores. Furthermore, cycling of the two electrical energy stores by the parallel charging is avoided and thus the service life of the electrical energy stores is increased.

It is particularly preferred if the power transmission arrangement in one operating mode is designed to adjust, by means of the electromagnetic converter unit and the DC-to-DC voltage converter, a first power flow from the AC voltage source to the first DC voltage sink and a second power flow from the AC voltage source to the second DC voltage sink, wherein the first and the second power flows can be adjusted independently of one another.

Hence, the operating mode of the power transmission arrangement corresponds, for example, to a charging operating mode of the first and second electrical energy stores. Advantageously, the first power flow from the AC voltage source to the first electrical energy store can be controlled independently of the second power flow from the AC voltage source to the second electrical energy store. The two power flows are therefore actively controllable.

In another embodiment, the electromagnetic converter unit has a transformer with a primary winding and a first and second secondary winding, wherein the primary winding is couplable to the AC voltage source.

The transformer is used to integrate in terms of circuitry a charging device for the first electrical DC voltage sink (the first electrical energy store) and a DC-to-DC voltage converter for supplying the second electrical DC voltage sink. In addition, use of the transformer leads to electrical isolation of the primary-side and secondary-side circuit units and hence to increased safety of the power transmission arrangement.

In another embodiment, the electromagnetic converter unit has a primary-side circuit unit which is couplable on the input side to the AC voltage source and which is connected on the output side to the primary winding.

By way of example, owing to the primary-side circuit unit, a voltage adjustment and/or a predefined actuation of the primary winding of the transformer is made possible. An input voltage provided by the AC voltage source (for example from the power supply system) can thus be adjusted to the requirements of the power transmission arrangement during a charging process of the first electrical DC voltage sink.

According to another embodiment, the primary-side circuit unit has at least a rectifier circuit which is couplable on the input side to the AC voltage source, a power factor correction filter which is coupled on the input side to the rectifier circuit, and a chopper which is coupled on the input side to the power factor correction filter and on the output side to the primary winding.

The so-called power factor of the power transmission arrangement is increased owing to the power factor correction filter. By increasing the power factor, transmission losses and disturbances in a power supply system coupled to the power transmission arrangement can be minimized.

The power drawn from the AC voltage source and provided to the electrical DC voltage sinks can be precisely controlled using the chopper.

In another embodiment, the first and/or second DC voltage circuits have/has a further rectifier circuit.

Owing to the rectifier circuit, an AC voltage provided by the secondary winding in question is rectified. In this case, the rectification can be performed using an actively controlled or an uncontrolled rectifier circuit.

According to another embodiment, the further rectifier circuit has at least a diode or a transistor.

Uncontrolled rectification is realized using diode circuits. By way of example, in this embodiment, a bridge rectifier—also referred to as a Graetz circuit or two-pulse bridge circuit—can be used.

By way of example, a bridge circuit consisting of transistors (for example MOSFETs) can be used as controllable rectifier circuit. In this case, the transistors have substantially lower conducting losses than diodes. However, in the case of controllable rectifier circuits, there is additional circuit complexity owing to the necessary drive logic for the transistors. However, it is advantageous for such a bridge circuit to be bidirectionally operable. In this way, the bridge circuit can also be operated, for example, as a chopper in a so-called reverse operation on the basis of the actuation of the transistors.

According to another embodiment, the DC-to-DC voltage converter has a buck converter, a boost converter or a buck-boost converter.

Using the DC-to-DC voltage converter, a DC voltage supplied at an input of the DC-to-DC voltage converter is converted into a DC voltage with a higher (boost converter) or lower (buck converter) voltage level. In addition, the power at the DC voltage sink coupled to the DC-to-DC voltage converter can be regulated and adjusted to the present consumption using the DC-to-DC voltage converter.

According to another embodiment, the first DC voltage circuit is coupled on the input side to the first secondary winding and the second DC voltage circuit is coupled on the input side to the second secondary winding.

In this exemplary embodiment, a buck converter, a boost converter or a buck-boost converter is used as DC-to-DC voltage converter. If the DC-to-DC voltage converter is coupled, for example, to the second secondary winding of the transformer, the chopper of the primary-side circuit unit is used to control the power drawn from the AC voltage source and supplied to the DC voltage sinks (total power flow). Since fixed voltage ratios are predefined by the number of turns of the transformer, the DC-to-DC voltage converter coupled to the second secondary winding is used to adjust the second power flow from the AC voltage source to the second DC voltage sink. The first power flow from the AC voltage source to the first DC voltage sink arises automatically from subtraction of the second power flow from the total power flow. It is therefore ensured that the two power flows can be adjusted independently of one another.

In an alternative embodiment, the DC-to-DC voltage converter has a further chopper, a further transformer with a primary side and a secondary side, wherein the primary side is coupled to the further chopper, and a rectifier which is coupled on the input side to the secondary side of the further transformer.

A DC-to-DC voltage converter with electrical isolation is realized by this embodiment. Owing to the use of the further transformer, the power flow control of the DC-to-DC voltage converter is completely decoupled from the power flow control through the chopper of the primary-side circuit unit. This enables a highly flexible adjustment of the two power flows.

In another embodiment, the second DC voltage circuit has the DC-to-DC voltage converter, wherein the first DC voltage circuit is connected on the input side to the first secondary winding and wherein the second DC voltage circuit is couplable on the input side to the primary-side circuit unit.

In this embodiment, an electrically isolated DC-to-DC voltage converter with a transformer is used as DC-to-DC voltage converter. Thus, the first power flow is controlled by the chopper of the primary-side circuit unit and the second power flow is controlled by the electrically isolated DC-to-DC voltage converter. Consequently, the power transmission arrangement in this embodiment has isolated adjustment stages for the power flow control. This enables a very precise, independent adjustment of the two power flows.

According to another embodiment, at least one of the DC voltage circuits has a low-pass filter.

By way of example, the low-pass filter has an output inductor and an output capacitor which are arranged as an LC filter. The LC filter is used to smooth an electric current and/or an electric voltage which are/is provided at an input of the low-pass filter.

In another embodiment, the DC-to-DC voltage converter is connected to an input or an output of the low-pass filter.

If the DC-to-DC voltage converter is connected to the input of the low-pass filter, advantages in terms of circuitry arise by, for example, it being possible for an output inductor to be used both for the DC-to-DC voltage converter and for the low-pass filter. If the DC-to-DC voltage converter is connected to the output of the low-pass filter, the DC-to-DC voltage converter can be controlled in a manner completely decoupled from the primary-side circuit unit since the input voltage of the DC-to-DC voltage converter is buffered by the low-pass filter.

According to another embodiment, the DC-to-DC voltage converter can be bridged by means of a bridging circuit in order to deactivate the DC-to-DC voltage converter.

By way of example, if the DC-to-DC voltage converter is only used in the operating mode in which the two DC voltage sinks are charged, the DC-to-DC voltage converter can be designed specifically for this operating mode. This means that the electrical components of the DC-to-DC voltage converter are to be configured, for example, only for a particular power class. This leads to a cost-effective realization of the DC-to-DC voltage converter.

It is particularly preferred if the power transmission arrangement is operable in a further operating mode in which the power transmission arrangement is decoupled from the AC voltage source, the first DC voltage sink is operable as DC voltage source and is couplable to the primary-side circuit unit or the first DC voltage circuit in order to feed electrical power into the power transmission arrangement, and in which the DC-to-DC voltage converter is deactivated, wherein the power transmission arrangement in the further operating mode is designed to adjust, by means of the electromagnetic converter unit or the first DC voltage circuit, a third power flow from the DC voltage source to the second DC voltage sink, which power flow can be adjusted independently of the first and second power flows.

In the further operating mode, the power transmission arrangement is isolated from the AC voltage source (for example from the power supply system), that is to say the charging operation of the first and second DC voltage sinks (for example first and second electrical energy stores) has ended. In the further operating mode, therefore, the first electrical energy store is used as DC voltage source for supplying the second DC voltage sink which is coupled to the second secondary winding of the transformer. The first electrical energy store may alternatively be coupled to the primary-side circuit unit or to the first DC voltage circuit which is connected to the first secondary winding of the transformer. If the first electrical energy store is coupled to the primary-side circuit unit, then the third power flow is built up via the primary-side circuit unit, the primary winding of the transformer, the second secondary winding of the transformer and the second DC voltage circuit to the second DC voltage sink. If the first electrical energy store is also coupled to the first DC voltage circuit, then the third power flow is conducted via the first DC voltage circuit, the first secondary winding of the transformer, which, in this embodiment, is used as primary winding of the transformer, the second secondary winding of the transformer and the second DC voltage circuit to the second DC voltage sink. Hence, in this embodiment, the power flow direction at the first DC voltage circuit is reversed compared to the charging operating mode (the first operating mode). This means that the first DC voltage circuit is not operated as a rectifier circuit but as a chopper circuit. Such a circuit unit which is operable both as rectifier and as chopper can be realized, for example, by a controlled bridge circuit composed of transistors.

In another embodiment, the first DC voltage sink is a traction battery of an electrically drivable vehicle and the first DC voltage is a voltage of a high-voltage on-board power supply system coupled to the traction battery, wherein the second DC voltage sink is an on-board power supply system battery of the vehicle and the second DC voltage is a voltage of a low-voltage on-board power supply system coupled to the on-board power supply system battery.

In this embodiment, the first operating mode of the power transmission arrangement corresponds to a charging operation of the traction battery and the on-board power supply system battery, wherein the power transmission arrangement is coupled to a power supply system. In contrast, the further operating mode of the power transmission arrangement corresponds to a driving operating mode of the electrically driven vehicle, in which driving operating mode the low-voltage on-board power supply system is supplied with electrical energy via the traction battery and the high-voltage on-board power supply system coupled to the traction battery. Using the power transmission arrangement, the power flows on the part of the high-voltage on-board power supply system and of the low-voltage on-board power supply system can be actively controlled and adjusted to the on-board power supply system consumers. In addition, parallel charging of the traction battery and the on-board power supply system battery is made possible by the power transmission arrangement. This leads to a shorter charging time compared to sequential charging of the two energy stores.

DETAILED DESCRIPTION

Figure 1:
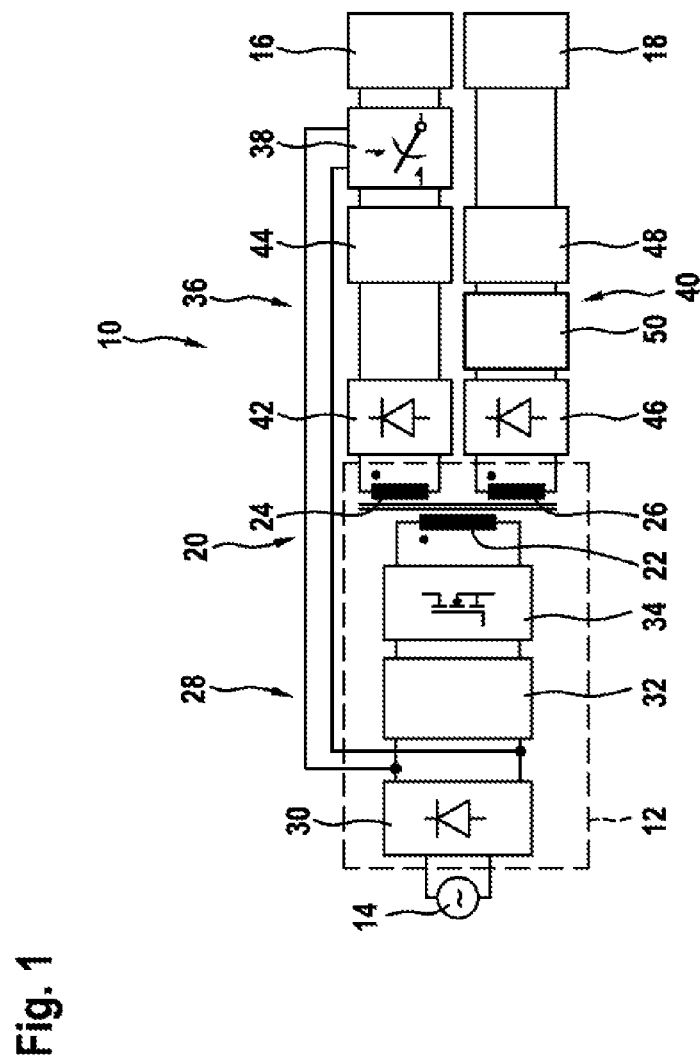
FIGS. 1 and 2 show various schematic embodiments of the power transmission arrangement according to a first circuit concept.

FIG. 1 schematically shows an embodiment of a power transmission arrangement 10 having an electromagnetic converter unit 12 which is couplable on the input side to an AC voltage source 14, in the present case a power supply system 14. The power transmission arrangement 10 can be installed, for example, in an electric or plug-in hybrid vehicle which is not shown in more detail in FIG. 1 and which has a traction battery 16 and an on-board power supply system battery 18. The electric or hybrid vehicle also has an electric machine which is used as drive motor and which is supplied with electrical energy by the traction battery 16. In this case, a high-voltage on-board power supply system is assigned to the traction battery 16, which high-voltage on-board power supply system typically has a voltage of more than 120 V. Furthermore, the on-board power supply system battery 18 is coupled to a low-voltage on-board power supply system which is usually operated at a DC voltage of 12 V and is used to supply the on-board power supply system consumers (for example radio, navigation system, etc.) installed in the vehicle.

The power transmission arrangement 10 according to the disclosure firstly enables, in a charging operating mode, parallel charging of the traction battery 16 and the on-board power supply system battery 18 provided that the electric or plug-in hybrid vehicle is connected to the power supply system 14. Secondly, the power transmission arrangement 10 ensures, in a driving operating mode of the electric or plug-in hybrid vehicle (in which the power transmission arrangement 10 is decoupled from the power supply system 14), supply of the low-voltage on-board power supply system from the traction battery 16.

For this purpose, the electromagnetic converter unit 12 has a transformer 20 with a primary winding 22, a first secondary winding 24 and a second secondary winding 26. Furthermore, the electromagnetic converter unit 12 has a primary-side circuit unit 28 with a rectifier circuit 30, a power factor correction filter 32 and a chopper 34. The rectifier circuit 30 is couplable on the input side to the power supply system 14 and provides a DC voltage on the output side. The power factor correction filter 32 is used to increase the power factor in order to keep the disturbing effect on the power supply system 14 as low as possible (so-called system perturbation). In addition, the chopper 34 is coupled to the primary winding 22 of the transformer 20.

Furthermore, the power transmission arrangement 10 has a first DC voltage circuit 36 which is connected on the input side to the first secondary winding 24 of the transformer 20 and is couplable on the output side via a changeover box 38 to the traction battery 16. In addition, the power transmission arrangement 10 has a second DC voltage circuit 40 which is connected on the input side to the second secondary winding 26 of the transformer 20 and is couplable on the output side to the on-board power supply system battery 18.

The first DC voltage circuit 36 has a further rectifier circuit 42 and a low-pass or an LC filter 44. Similarly, the second DC voltage circuit 40 has a further rectifier circuit 46 and an LC filter 48. The further rectifier circuits 42, 46 are embodied in the present exemplary embodiment as uncontrolled rectifier circuits on the basis of semiconductor diodes. The LC filters 44, 48 each have, for example, an output inductor and an output capacitor and are used to smooth output-side currents or voltages of the LC filters 44, 48.

During a charging operation of the power transmission arrangement 10, the primary-side circuit unit 28 is connected to the power supply system 14. In addition, the changeover box 38 is switched so that the traction battery 16 is coupled to the first DC voltage circuit 36. Furthermore, the on-board power supply system battery 18 is connected to the second DC voltage circuit 40. Now, a total power flow drawn from the power supply system 14 is controlled using the chopper 34, said total power flow having a first power flow from the power supply system 14 to the traction battery 16 and a second power flow from the power supply system 14 to the on-board power supply system battery 18. Owing to the fixed translation ratios of the transformer 20, a voltage thus arises across the second secondary winding 26. However, according to the disclosure, the second DC voltage circuit 40 has a DC-to-DC voltage converter 50 which is embodied, for example, as a buck converter. Thus, using the DC-to-DC voltage converter 50, the second power flow from the power supply system 14 to the on-board power supply system battery 18 can be controlled and adjusted to the present consumption. The first power flow from the power supply system 14 to the traction battery 16 results automatically from subtraction of the second power flow from the total power flow. Hence, the first and the second power flows can be adjusted independently of one another.

If, for example, 3.3 kW is fed into the power transmission arrangement 10 from the power supply system 14, and 400 W is controlled into the circuit branch of the on-board power supply system battery 18, then the remaining power (that is to say 2.9 kW) is left over for charging the traction battery 16.

The same function for the control of the power flows can also be implemented using a boost converter 50. In this embodiment, a turns ratio of the transformer 20 must be selected such that an average value of a rectified input voltage at the DC-to-DC voltage converter 50 is always lower than the minimum voltage of the on-board power supply system battery 18.

If the power transmission arrangement 10 is operated in a so-called driving operating mode (that is to say the electric vehicle is in a driving operating mode and is decoupled from the power supply system 14), the changeover box 38 is switched such that the traction battery 16 is decoupled from the first DC voltage circuit 36 and connected to the primary-side circuit unit 28.

In a preferred embodiment, the DC-to-DC voltage converter 50 is deactivated during the driving operating mode. Thus, a third power flow from the traction battery 16 to the low-voltage on-board power supply system or to the on-board power supply system battery 18 is adjusted and is controlled via the chopper 34. The third power flow is hence adjustable independently of the two power flows during the charging operation of the power transmission arrangement 10.

The power transmission arrangement 10 according to the disclosure can therefore be used both as charging device and as on-board power supply system DC-to-DC voltage converter. The power flows can be actively controlled using the chopper 34 and the DC-to-DC voltage converter 50.

Further embodiments of the power transmission arrangement 10 or parts of the power transmission arrangement 10 are shown in the figures which follow. Identical elements with respect to the respectively preceding figures are denoted by identical reference signs. Therefore, substantially only the respective differences are explained below.

Figure 2:
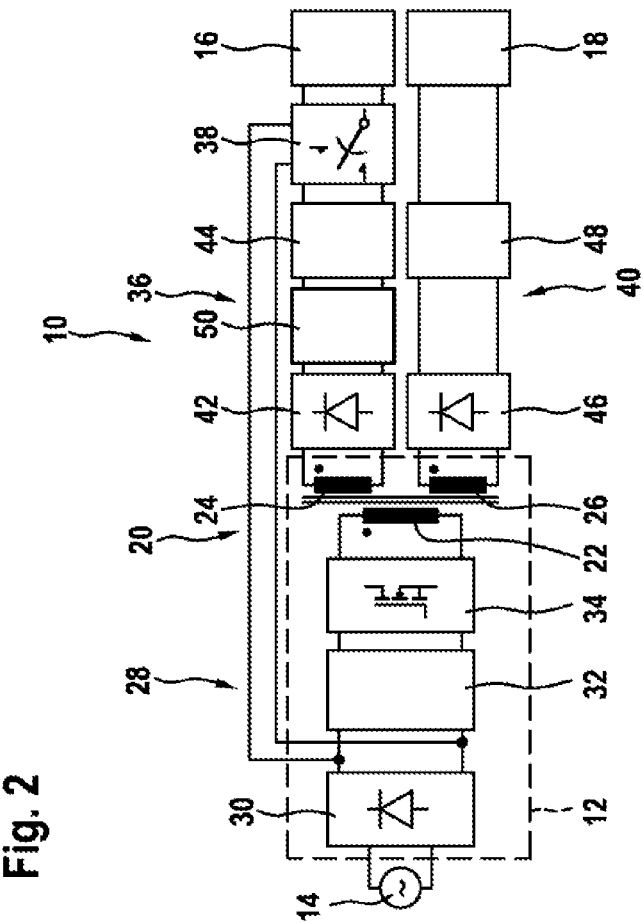

FIG. 2 shows a further schematic embodiment of the power transmission arrangement 10 according to the first circuit concept from FIG. 1. In contrast to the exemplary embodiment of FIG. 1, however, the first DC voltage circuit 36 has the DC-to-DC voltage converter 50. In this case, the DC-to-DC voltage converter 50 can again be embodied as buck converter, boost converter or combined buck-boost converter. In this embodiment, the first power flow from the power supply system 14 to the traction battery 16 is substantially adjusted by means of the DC-to-DC voltage converter 50. The second power flow from the power supply system 14 to the on-board power supply system battery 18 is controlled via the chopper 34.

Figure 3A:
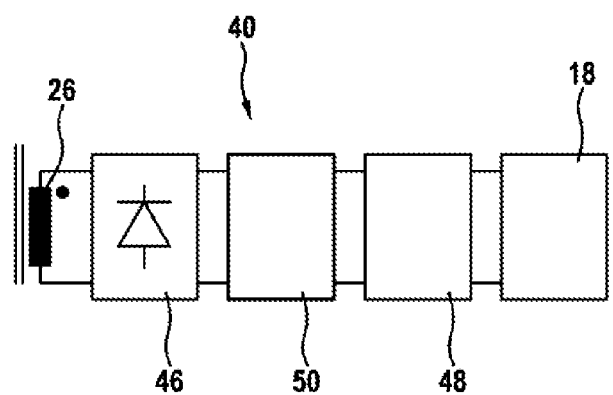
FIG. 3 shows various schematic embodiments of a secondary-side DC voltage circuit of the power transmission arrangement.
Figure 3B:
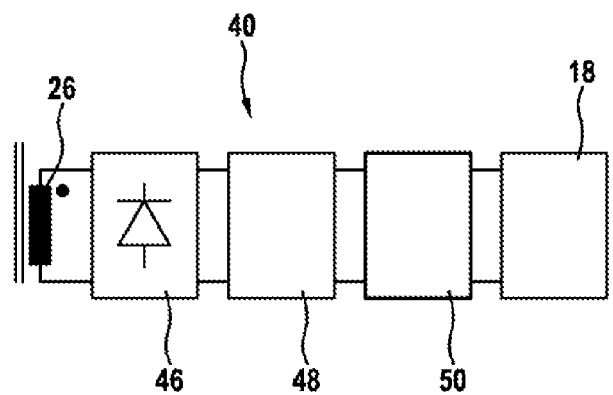

FIG. 3 shows various embodiments of the DC voltage circuit 40 which is coupled on the input side to the second secondary winding 26 and on the output side to the on-board power supply system battery 18. In FIG. 3a, the DC-to-DC voltage converter 50 is connected to an input of the LC filter 48. In contrast, in the exemplary embodiment in FIG. 3b, the DC-to-DC voltage converter 50 is connected to an output of the LC filter 48. Owing to the substantially symmetrical design of the two DC voltage circuits 36, 40, the circuit alternatives illustrated in FIGS. 3a and 3b also apply in an analogous manner to the first DC voltage circuit 36.

FIG. 4a shows by way of example a realization in terms of circuitry of the DC voltage circuit 40 illustrated in FIG. 3a. In this case, it is assumed that the DC-to-DC voltage converter 50 is a buck converter 50. Advantageously, the circuit has only one output inductor 52 which is used both for realizing the buck converter 50 and for realizing the LC filter 48. However, the control of the DC-to-DC voltage converter 50 is more complex since switching times of the buck converter 50 must be synchronized with switching times of the chopper 34. This results from the fact that, in this arrangement of the buck converter 50 and the LC filter 48, no buffering or smoothing of the input-side voltage of the buck converter 50 occurs.

In a driving operating mode of the power transmission arrangement 10 (DC/DC power, for example 1.8 kW), the function of the buck converter 50 can be deactivated by means of a switch 54. The functionality of the buck converter 50 is not necessary in the driving operating mode since the power flow to the on-board power supply system battery 18 is controlled, for example, by means of the chopper 34.

Figure 4B:
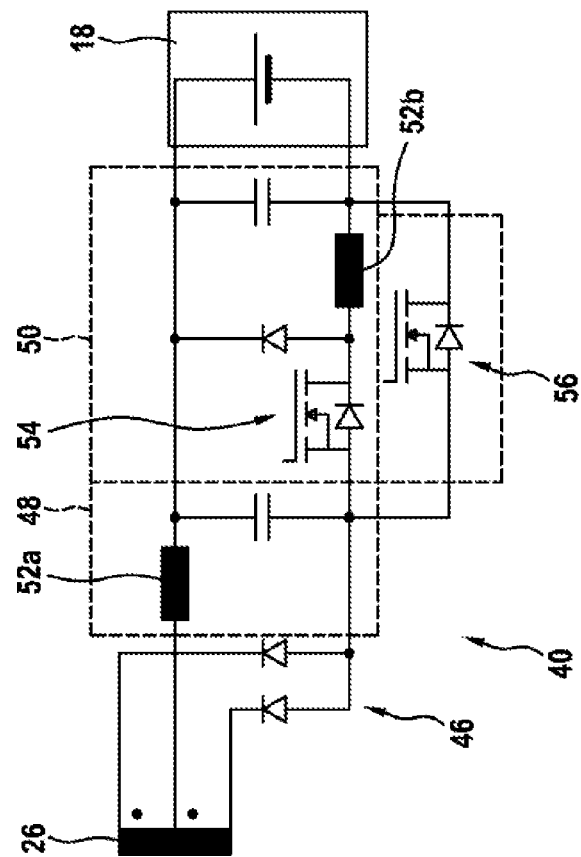
FIG. 4 shows realizations in terms of circuitry of the DC voltage circuits illustrated in FIG. 3.

FIG. 4b shows by way of example a realization in terms of circuitry of the second DC voltage circuit 40 illustrated in FIG. 3b. In this case, it should likewise be assumed that the DC-to-DC voltage converter 50 is a buck converter 50. Owing to the arrangement of the LC filter 48 upstream of the buck converter 50, the input voltage of the buck converter 50 is buffered by the LC filter 48. Thus, the buck converter 50 can be controlled in a manner decoupled from the primary-side chopper 34. However, in this embodiment, two output inductors 52a, 52b are required for realizing the LC filter 48 and the buck converter 50. Since the output inductor 52b is only used during the charging operation of the power transmission arrangement 10 to support on-board power supply system consumers of the low-voltage on-board power supply system (for example with a power in the region of at most 400 W), it is possible to configure the output inductor 52b and the switch 54 only for a relatively low power (for example at most 400 W). Thus, the additional costs for the circuit can be reduced. In the driving operating mode of the power transmission arrangement 10, the buck converter 50 can be bridged, for example, using a bridging circuit 56 or a bridging switch 56.

Figure 5:
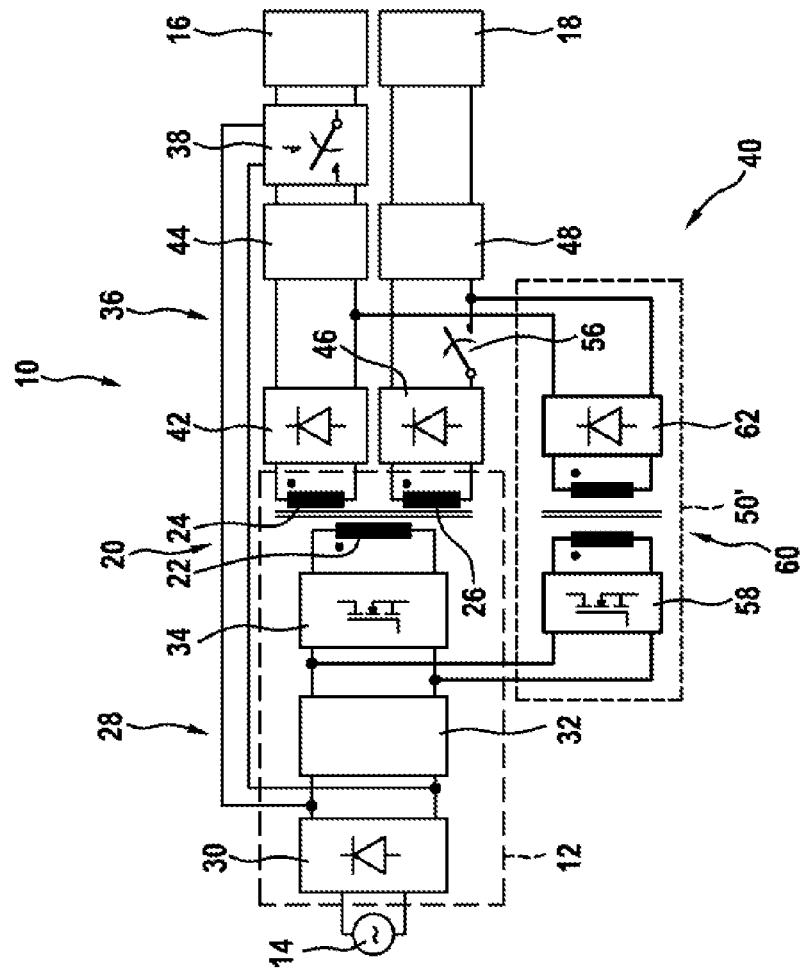
FIG. 5 shows a further schematic embodiment of the power transmission arrangement according to the first circuit concept.

FIG. 5 shows another embodiment of the power transmission arrangement 10 according to the first circuit concept.

In this shown embodiment, the second DC voltage circuit 40 has a DC-to-DC voltage converter 50' with electrical isolation. In particular, the DC-to-DC voltage converter 50' has a further chopper 58, a further transformer 60 and a rectifier 62. The chopper 58 is coupled on the input side to the primary-side circuit unit 28 and on the output side to the further transformer 60. The rectifier 62 is coupled on the input side to a secondary side of the further transformer 60 and on the output side to the LC filter 48.

In the charging operating mode of the power transmission arrangement 10, the first power flow from the power supply system 14 to the traction battery 16 is controlled by means of the chopper 34. In contrast, the second power flow from the power supply system 14 to the on-board power supply system battery 18 is adjusted by the further chopper 58.

In a driving operating mode of the power transmission arrangement 10, the DC-to-DC voltage converter 50' is deactivated by means of appropriate actuation of the further chopper 58 and an appropriate circuit of the bridging switch 56. The changeover box 38 is switched such that the third power flow from the traction battery 16 via the primary-side circuit unit 28, the transformer 20, the further rectifier circuit 46 and the LC filter 48 to the on-board power supply system battery 18 is adjusted. Hence, the DC-to-DC voltage converter 50' can preferably be configured only for a low power (at most 400 W) during the charging operation of the power transmission arrangement 10.

Figure 6:
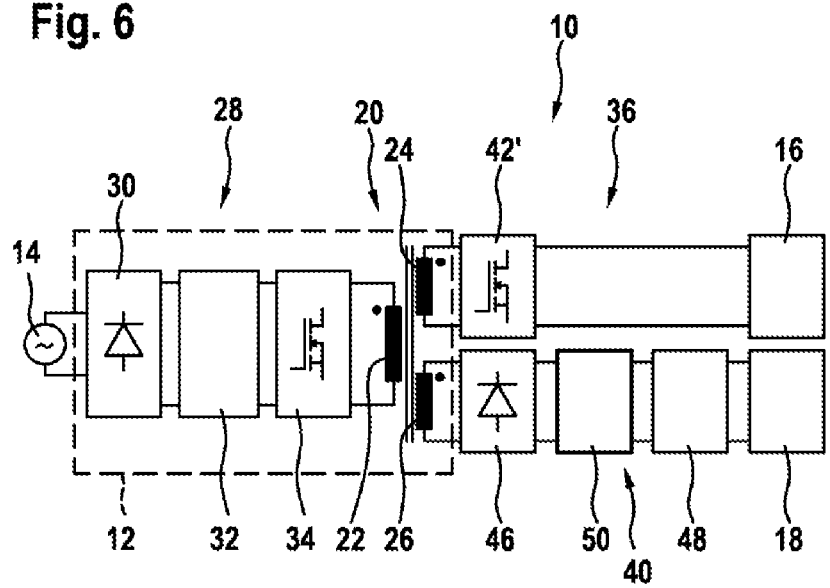
FIGS. 6 and 7 show various schematic embodiments of the power transmission arrangement according to a second circuit concept.

FIG. 6 shows an embodiment of the power transmission arrangement 10 according to a second circuit concept. In contrast to the preceding embodiments, the power transmission arrangement 10 according to the second circuit concept has no changeover box 38. Instead, the first DC voltage circuit 36 has an actively actuable bridge circuit 42' composed of transistors, which actively actuable bridge circuit is operable as further rectifier circuit 42' or as chopper 42' on the basis of the actuation or on the basis of the direction of the power flow.

In the charging operating mode of the power transmission arrangement 10, the bridge circuit 42' is operated as further rectifier circuit 42'. Therefore, similarly to the preceding embodiments, the first power flow from the power supply system 14 to the traction battery 16 is controlled by means of the chopper 34 or by means of the chopper 34 together with the chopper 42'. The second power flow from the power supply system 14 to the on-board power supply system battery 18 is substantially adjusted by the DC-to-DC voltage converter 50. In this case, the DC-to-DC voltage converter 50 can again be embodied as buck converter, as boost converter or as combined buck-boost converter. Furthermore, the DC-to-DC voltage converter 50 can be implemented either upstream or downstream of the LC filter 48, in accordance with the embodiments shown in FIG. 3. If the DC-to-DC voltage converter 50 is implemented as buck converter 50, the realizations in terms of circuitry of the buck converter 50 and the LC filter 48 illustrated in FIG. 4 also apply in FIG. 6.

If the power transmission arrangement 10 is operated in the driving operating mode, the power transmission arrangement 10 is decoupled from the power supply system 14. The power flow at the traction battery 16 is reversed, that is to say the traction battery 16 is operated as DC voltage source in order to feed power into the power transmission arrangement 10. As a result of this, the bridge circuit 42' is operated as chopper 42' in the driving operating mode. Hence, the third power flow from the traction battery 16 to the low-voltage on-board power supply system or to the on-board power supply system battery 18 is controlled by means of the chopper 42'. The function of the DC-to-DC voltage converter 50 is preferably deactivated by means of the switch 54 here.

Figure 7:
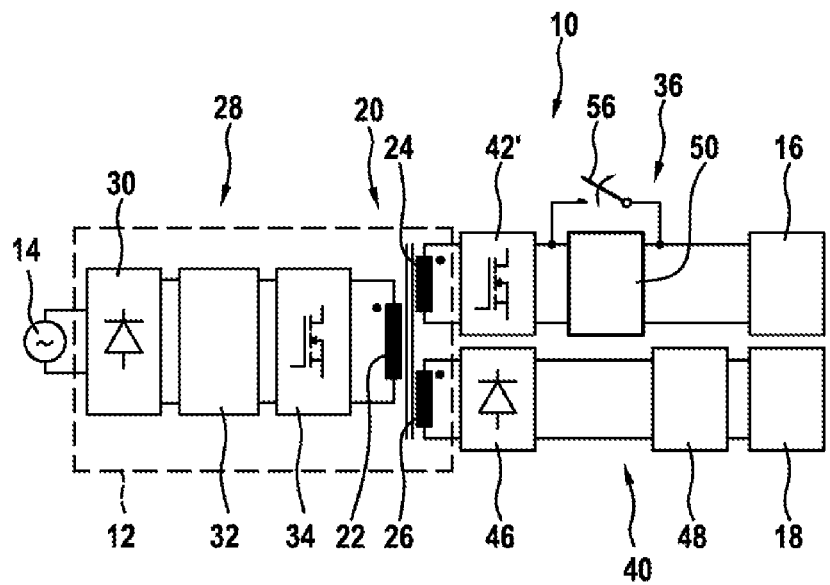

FIG. 7 shows a further embodiment of the power transmission arrangement 10 according to the second switching concept. In contrast to FIG. 6, the DC-to-DC voltage converter 50 in the present embodiment is embodied in the first DC voltage circuit 36. The DC-to-DC voltage converter 50 can again be a buck converter, a boost converter or a combined buck-boost converter. In this case, the DC-to-DC voltage converter 50 can be bridged by means of the bridging switch 56. In the charging operating mode of the power transmission arrangement 10, the bridging switch 56 is open in order to be able to control the power flow to the traction battery 16 by means of the DC-to-DC voltage converter 50. In the driving operating mode of the power transmission arrangement 10, the bridging switch 56 is closed in order to deactivate the function of the DC-to-DC voltage converter 50. The third power flow from the traction battery 16 to the on-board power supply system battery 18 is adjusted, as in the exemplary embodiment from FIG. 6, via the bridge circuit 42' or the chopper 42'.

The invention claimed is:

1. A power transmission arrangement comprising:
   a primary-side circuit unit having (i) an input side coupled to an AC voltage source and (ii) an output side;
   a transformer having a primary winding, a first secondary winding, and a second secondary winding, the primary winding being coupled to the output side of the primary-side circuit unit;
   a first DC voltage circuit having an (i) input side that is coupled to the first secondary winding and (ii) an output side, the first DC voltage circuit being configured to provide a first DC voltage on the output side thereof;
   a switching device configured to, (i) in a first state, couple a first battery to the output side of the first DC voltage circuit and decouple the first battery from DC voltage lines of the primary-side circuit, and (ii) in a second state, couple the first battery to the DC voltage lines of the primary-side circuit and decouple the first battery from the output side of the first DC voltage circuit; and
   a second DC voltage circuit having (i) an input side that is coupled to the second secondary winding and (ii) an output side that is coupled to a second battery, the second DC voltage circuit being configured to provide a second DC voltage on the output side thereof,
   wherein at least one of the first DC voltage circuit and the second DC voltage circuit has a DC-to-DC voltage converter configured to adjust a voltage at the output side of the at least one of the first DC voltage circuit and the second DC voltage circuit.

2. The power transmission arrangement as claimed in claim 1, the primary-side circuit unit, the transformer, and the DC-to-DC voltage converter being configured to, in one operating mode:
   adjust (i) a first power flow from the AC voltage source to the first battery and (ii) a second power flow from the AC voltage source to the second battery, the first power flow and the second power flows being adjusted independently of one another.

3. The power transmission arrangement as claimed in claim 1, the primary-side circuit unit comprising:
   a rectifier circuit having an input side coupled to the AC voltage source;
   a power factor correction filter having an input side coupled to the rectifier circuit; and
   a chopper having an input side coupled to the power factor correction filter and an output side coupled to the primary winding of the transformer.

4. The power transmission arrangement as claimed in claim 1, at least one of the first DC voltage circuit and the second DC voltage circuit further comprising:
   a further rectifier circuit.

5. The power transmission arrangement as claimed in claim 1, the DC-to-DC voltage converter comprising one of:
   a buck converter;
   a boost converter; and
   a buck-boost converter.

6. The power transmission arrangement as claimed in claim 1, the DC-to-DC voltage converter comprising:
   a chopper;
   a further transformer having a primary side and a secondary side, the primary side being coupled to the further chopper; and
   a rectifier having an input side coupled to the secondary side of the further transformer.

7. The power transmission arrangement as claimed in claim 1, wherein the second DC voltage circuit has the DC-to-DC voltage converter, the power transmission arrangement further comprising:
   a further transformer configured to couple the input side of the second DC voltage circuit to the primary-side circuit unit.

8. The power transmission arrangement as claimed in claim 1, at least one of the first DC voltage circuit and the second DC voltage circuit comprising:
   a low-pass filter.

9. The power transmission arrangement as claimed in claim 8, wherein the DC-to-DC voltage converter is connected to one of an input of the low-pass filter and an output of the low-pass filter.

10. The power transmission arrangement as claimed in claim 1, further comprising:
    a bridging circuit configured to bridge the DC-to-DC voltage converter to deactivate the DC-to-DC voltage converter.

11. The power transmission arrangement as claimed in claim 1, wherein, in a further operating mode:
    the primary-side circuit unit is configured to decouple from the AC voltage source;

the switching device is operated to couple the first battery to the output side of the first DC voltage circuit and decouple the first battery from the DC voltage lines of the primary-side circuit unit, the first battery being operated as a DC voltage source to feed electrical power into the power transmission arrangement;

the DC-to-DC voltage converter is deactivated; and the first DC voltage circuit is configured to adjust a third power flow from the first battery to the second battery, the third power flow being adjusted independently of a first power flow from the AC voltage source to the first battery and a second power flow from the AC voltage to the second battery.

12. The power transmission arrangement as claimed in claim 1, wherein:

the first battery is a traction battery of an electrically drivable vehicle;

the first DC voltage is a voltage of a high-voltage on-board power supply system coupled to the traction battery;

the second battery is an on-board power supply system battery of the electrically drivable vehicle; and the second DC voltage is a voltage of a low-voltage on-board power supply system coupled to the on-board power supply system battery.

13. The power transmission arrangement as claimed in claim 1, wherein, in a further operating mode:

the primary-side circuit unit is configured to decouple from the AC voltage source;

the switching device is operated to couple the first battery to the DC voltage lines of the primary-side circuit unit and decouple the first battery from the output side of the first DC voltage circuit, the first battery being operated as a DC voltage source to feed electrical power into the power transmission arrangement;

the DC-to-DC voltage converter is deactivated; and the primary-side circuit unit and the transformer, is configured to adjust a third power flow from the first battery to the second battery, the third power flow being adjusted independently of a first power flow from the AC voltage source to the first battery and a second power flow from the AC voltage to the second battery.

14. A power transmission arrangement comprising:

an electromagnetic converter unit having an input side that is coupled to an AC voltage source;

a first DC voltage circuit having an input side that that is coupled to the electromagnetic converter unit and an output side that is coupled to a first electrical DC voltage sink, the first DC voltage circuit being configured to provide a first DC voltage on the output side thereof; and a second DC voltage circuit having an input side that is coupled to the electromagnetic converter unit and an output side that is coupled to a second electrical DC voltage sink, the second DC voltage circuit being configured to provide a second DC voltage on the output side thereof, wherein at least one of the first DC voltage circuit and the second DC voltage circuit has a DC-to-DC voltage converter configured to adjust a voltage at the output side of the at least one of the first DC voltage circuit and the second DC voltage circuit, wherein power transmission arrangement further comprises a bridging circuit configured to bridge the DC-to-DC voltage converter to deactivate the DC-to-DC voltage converter.

* * * * *